United States Patent [19]

Saxe

[11] Patent Number: 4,727,483
[45] Date of Patent: Feb. 23, 1988

[54] LOOP CONTROL SYSTEM FOR DIGITAL PROCESSING APPARATUS

[75] Inventor: Charles L. Saxe, Beaverton, Oreg.

[73] Assignee: Tektronix, Inc., Beaverton, Oreg.

[21] Appl. No.: 641,097

[22] Filed: Aug. 15, 1984

[51] Int. Cl.$^4$ ............................................. G06F 7/00
[52] U.S. Cl. ................................................ 364/200
[58] Field of Search ... 364/200 MS File, 900 MS File; 377/45

[56] References Cited

U.S. PATENT DOCUMENTS

| 3,308,436 | 3/1967 | Borck et al. | 364/200 |
| 3,924,270 | 12/1975 | Kurtzberg | 364/200 |
| 4,060,848 | 11/1977 | Hyatt | 364/200 |
| 4,290,115 | 9/1981 | Pitt et al. | 364/900 |
| 4,306,287 | 12/1981 | Huang | 364/200 |
| 4,379,328 | 4/1983 | Catiller | 364/200 |
| 4,462,074 | 7/1984 | Linde | 364/200 |
| 4,511,962 | 4/1985 | Machida et al. | 364/200 |

OTHER PUBLICATIONS

RCA Product Specification Sheet for ATMAC Microprocessor.
"Microcomputer with 32-Bit Arithmetic Does High--Precision Number Crunching", *Electronics*, Feb. 24, 1982, pp. 105-110, Written by: K. McDonough, E. Caudel, S. Magar, and A. Leigh.
"A Microcomputer with Digital Signal Processing Capability", IEEE International *Solid-State Circuits Conference*, Feb. 10, 1982. By: S. Magar, Edward R. Caudel, and Anthony Leigh, p. 32.
"16-Bit Bipolar Microprocessor Has On-Chip Multiply and Divide", By: Gary Burke, Shai Mor, and Ashok Suri, *Journal of Semiconductor Progress*, 1st Qtr., 1982, Published by: Fairchild Semiconductor.

*Primary Examiner*—David Y. Eng
*Attorney, Agent, or Firm*—William A. Birdwell; George T. Noe

[57] ABSTRACT

A loop control system for digital processing apparatus. A dedicated storage register and associated counting register are provided for receiving a starting value representing a number of passes through a program loop. An iteration circuit is provided for receiving the value in the counting register, iterating it, and storing the new value in the same counting register with each successive pass through the loop. A detector is provided for comparing the output of the iteration circuit to a predetermined value and providing a completion signal when the new value and the ending value have a predetermined relative relationship. Control logic is provided for causing the value in the storage register to be transferred into the counting register upon the occurrence of an output signal from the detector circuit. A plurality of pairs of storage and counting registers may be provided for keeping track of the number of iterations of nested loops.

8 Claims, 3 Drawing Figures

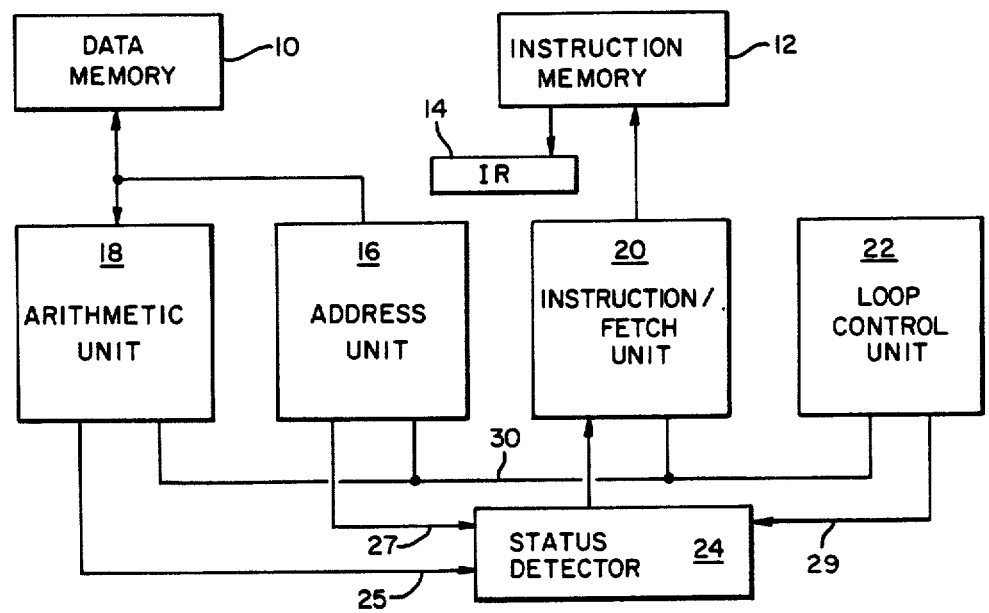
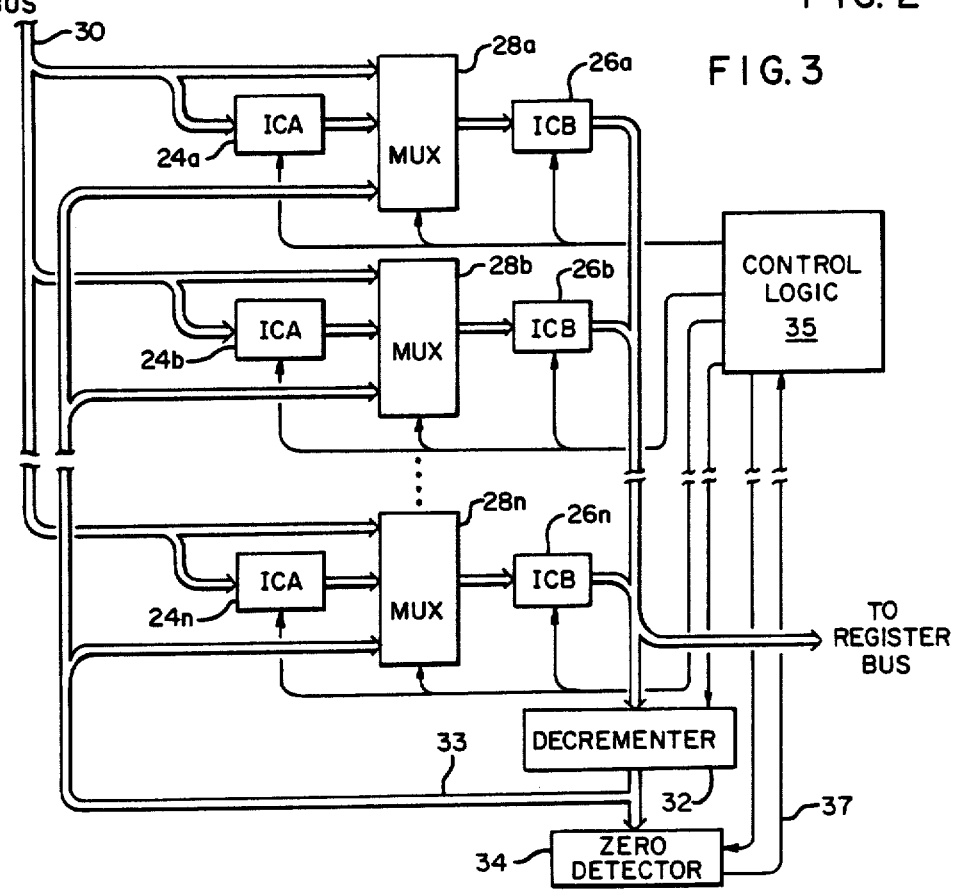

LOOP CONTROL SYSTEM FOR DIGITAL PROCESSING APPARATUS

BACKGROUND OF THE INVENTION

This invention relates to digital processing apparatus, in particular to a system for controlling the number of iterations of nested program loops in a digital processing apparatus.

In the use of digital data processing apparatus it is often necessary, or desirable, to perform sets of operations iteratively in nested loops. This is particularly so in array processing. For example, in digital filtering of a signal represented by an array of samples of a signal waveform convolution is typically performed. A general expression representing the convolution of the signal x by the filter characteristic h is as follows:

$$y(i) = \sum_{n=o}^{P} h(i) \cdot x(i + n)$$

P = number of coefficients of the filter characteristic i = the number of a data point; $0 \leq i \leq P$ In this example each of the data points representing the waveform x is first multiplied by the corresponding coefficient of h and the sum of those products is added; thereafter, the coefficients are shifted by one position and this process is repeated. The latter, inner loop, involving the multiplication and addition for each of the coefficients of the filter, is repeated until the entire data set representing the signal waveform has been convolved with the filter characteristics, thereby terminating one pass through the outer loop.

One objective ordinarily sought in array processing, particularly in signal processing, is to perform computation at high speed. This is especially important where real time processing is desirable. Where the computation algorithm requires the repetitive execution of a set of statements in a loop, some means must be provided for determining the number of times the loop is to be repeated and counting the number of passes through the loop. Where that loop is nested within another loop, some means must be provided for reinitializing the inner loop counter for each pass of the outer loop. In conventional nested loop programming, as would be used with known microprocessors particularly suitable for signal processing, for example the TMS 320 microprocessor manufactured by Texas Instruments Corporation and the F9445 microprocessor manufactured by Fairchild, Inc., some register, or memory location, must be used as a counter for each of the loops involved. To initialize the counter a program step is needed to fetch from memory the value representing the number of passes to be made through the loop and place it in the register. To ascertain the current number of passes made through the loop, the value in the register must be incremented or decremented with each pass, and to determine whether the full number of passes has been accomplished, the value in the register must be compared to some reference, or tested with each pass, each of which requires a separate program step. These program steps require additional time. Since this additional time decreases the speed of processing, it would be desirable to eliminate such program steps.

SUMMARY OF THE INVENTION

The present invention reduces the required number of steps and time for data processing by providing dedicated storage and counting registers, and associated control logic, which eliminate the need for repetitive fetch, store, iterate, and compare steps. A pair of registers is used for each loop, one register being used to store an initial value representing the number of passes through the loop and another register being used to store the current number of passes through the loop. After each pass through the loop the value in the counting register is iterated and compared to a reference value. Where the comparison shows a predetermined relationship, indicating that the loop has been executed the proper number of times, a completion signal is generated and the value in the storage register is automatically loaded into the associated counting register for reinitialization. Where the desired number of passes has not occurred the iterated value is simply reloaded into the counting register, thereby updating the counting register. Provision is made for iterating the value in the counting register only upon command.

Therefore, it is a principal object of the present invention to provide a novel system for controlling loop sequences in a digital processing apparatus.

It is another object of the present invention to provide a loop control system which reduces the time required for determining whether a loop has been executed the required number of times.

It is a further object of the present invention to provide a loop control system wherein a loop execution counter can be initialized without fetching and storing values from memory.

These and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 shows an example of processor architecture with which the loop control system of the present invention could be used advantageously.

FIG. 3 shows a block diagram of a preferred embodiment of the loop control system of the present invention.

DETAILED DESCRIPTION OF THE INVENTION

Figure 1:
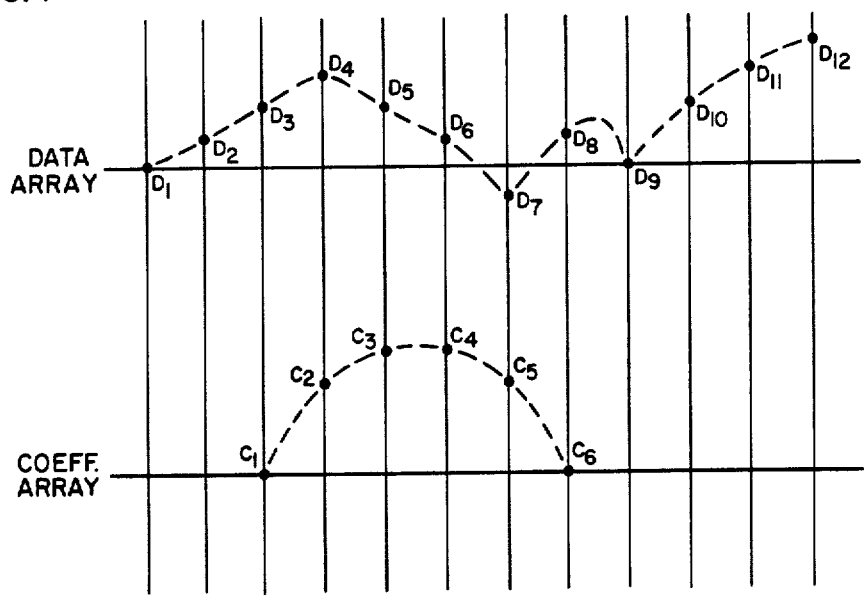
FIG. 1 shows exemplary sets of data points and coefficients to be employed in an array processing computation.

In FIG. 1 the data points D1–D12 represent a sample signal waveform to be operated upon by the function represented by the coefficients C1–C6. These sets of data points and coefficients represent arrays to be processed. In a typical application the data array would be convolved with the coefficient array. Accordingly, D1 would be multiplied by C1, D2 by C2, and so on until D6 is multiplied by C6, during the course of which the respective products would be totalled. The process of multiplying the data points by the coefficients and totalling the products ordinarily comprises a series of steps to be performed repetitively, that is, a loop. After each pass through this first loop, the pointer to the coefficient is reinitialized and the pointer to the data is iterated a predetermined amount, typically one, so that the coefficient array is, in effect, shifted over by one or more data points. The inner loop is then executed again, for example by multiplying D2 by C1, D3 by C2, and so on, and adding the products. This process is repeated until a predetermined number of data points has been multiplied by all of the coefficients. In this simple example the inner loop (multiplication and addition) is repeated several times for each pass through the outer loop (initialization of the data pointer); however, other applications may involve three or more nested loops. The present invention can even be used to advantage where only one loop is repetitively executed.

Referring to FIG. 2, a representative array processing apparatus with which the loop control system of the present invention could be used, contains a data memory 10, for storing data points and coefficients, an instruction memory 12, for storing program instructions for performing a desired computational process, an instruction register 14 for receiving instructions from the instruction memory and directing them to other logical units of the processor for implementation thereof, an address unit 16, for addressing the data memory 10 to fetch data therefrom, an arithmetic unit 18, for performing operations on the data, and an instruction fetch unit 20, for fetching from the instruction memory 12 instructions for implementation by the other logical units of the processor. The design and construction of circuitry for performing the aforementioned general functions is commonly understood in the art and, except for certain requirements as to control logic included in the instruction fetch unit mentioned below, no particular design is necessary for implementation of the present invention.

A loop control unit 22, representing an embodiment of loop control system of the present invention, is closely associated with the instruction fetch unit 20, and a status detector 24 is employed to communicate to the instruction fetch unit 20 the status of the various logic of units in the processor as indicated by status lines 25, 27 and 29. It is to be recognized that, while this representative architecture is particularly adapted for use of the loop control system of the present invention, other processor architectures may also be employed and it is not intended by the exemplary use of this architecture to limit the scope of the present invention.

Turning now to FIG. 3, the loop control unit 22 includes one or more storage registers ("ICA") 24a-n, each having an input port and an output port, associated counting registers ("ICB") 26a-n, each having an input port and an output port, and associated multiplexers ("MUX") 28a-n, each having three input ports and an output port. The multiplexers each selectively connect one of their inputs to their output, hence to the input of their associated counting register. Depending upon the complexity desired for the processor one or a plurality of sets of storage registers, counting registers, and multiplexers can be provided, as shown.

Each storage register 24a-n receives as an input from a register bus 30 a starting value representing the number of passes through a loop with which that register is to be associated. Initially, the counting registers 26a-n also receive the starting value received by their associated storage register through operation of the multiplexers 28a-n. This and other steps described hereafter are caused to occur by control logic 35 which, in the case of the architecture shown in FIG. 2, is preferably at least partially included in the instruction fetch unit 20 and includes the function of the status detector 24.

An iteration device is provided, in this case, decrementer 32, for updating the values stored in the counting registers 26a-n. Upon command from and under control of the control logic 35, the value in a selected counting register is transferred to the decrementer 32 where it is decremented, and the output 33 of the decrementer, representing the updated count, is transferred to one of the input ports of the multiplexers 28a-n for storage of the updated value in the counting register from which the original value was obtained, the updated count representing the current number of passes through the loop with which the counting register is associated. The value in the counting register could also be placed on the register bus 30 for use by other logic units in the processor. The output 33 of the decrementer 32 is also transferred to a circuit for comparing the updated value to reference, in this case zero detector circuit 34.

In the preferred embodiment disclosed in FIG. 3, it is contemplated that the initial value will represent the number of passes to be made through a loop (less one), that the initial value in the counting register will be decremented after each pass, and that completion of the iterations of a loop corresponds to the point at which the initial value is decremented to zero; hence, a zero detector circuit is utilized. However, it is to be recognized that the initial value could be related to some final value other than zero, that it might be incremented, rather than decremented, that it might be iterated by a value other than one, and that the zero detector circuit might be, in the more general case, a comparator which compares the updated value to some other predetermined value, rather than zero.

When the final value from a counting register (representing the last pass through the loop for which that register is used) is detected, the zero detector circuit 34 issues a completion signal at output 37 to control logic 35. In the exemplary architecture shown in FIG. 2, that signal is passed through the status detector 24; however, it is to be recognized that other arrangements could be employed without departing from the principles of the invention. It is also to be recognized that no particular control logic circuitry is needed for employment of the loop control unit of the present invention, but that the circuitry that is used must provide control signals to cause each storage register 24a-n to accept the right starting value at the right time, to select the proper multiplexer 28a-n and the proper input to the multiplexer at the right time, to cause each counting register 26a-n to accept an output from its corresponding multiplexer at the right time, to cause the iteration device (decrementer 32) to iterate the count by a selected value and to cause the detector circuit (zero detector 34) to test the resultant value in accordance with program instructions, and to receive the completion signal output 37 from the detector circuit. The design and construction of such circuitry is commonly understood in the art.

At the end of a loop, the control logic 35 should cause the multiplexer to load the value in its associated storage register into its associated counting register, thereby reinitializing that particular counter automatically and eliminating the need to fetch the initial value from memory and store it in the counting register.

In some operations only one pair of storage and counting registers would be necessary; however, where more than one nested loop must be repeated, two or more pairs of storage and counting registers are needed.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

I claim:

1. A loop control system for use in a digital processing system having means for performing operations on data, comprising:
   (a) storage means for receiving from digital processing system a starting value representing the number of repetitions to be made of a set of operations;
   (b) counting means, associated with said storage means, for receiving simultaneously with said storage means said starting value from said digital processing means and for storing a new value therein with each successive repetition of a set of operations and being reinitialized by said starting value stored in said storage means for a subsequent set of operations;
   (c) iteration means, connected to said counting means, for receiving from said counting means a value stored therein, stepping said value to a new value, and storing the resultant new value back in said counting means; and
   (d) detector means, connected to said iteration means, for comparing said new value to an ending value, and issuing a completion signal when said new value and said ending value have a predetermined relationship;
   wherein said storage means comprises a plurality of storage registers for storing respective starting values and said counting means comprises a plurality of counting registers associated with respective storage registers, said loop control system further comprising control logic means for transferring a value from a selected counting register to said iteration means and transferring said new value to said selected counting register for storage therein.

2. The loop control system of claim 1 wherein said iteration means includes means, responsive to said control logic means, for selectively incrementing or decrementing by a selected amount a value received from a counting register.

3. The loop control system of claim 1 wherein said control logic means includes means, responsive to said completion signal of said detector means, for causing the starting value in a storage register to be loaded into its associated counting register upon issuance of said completion signal.

4. The loop control system of claim 1 further comprising an input bus connected to each of said storage registers, said storage registers and said iteration means each having respective output ports, and wherein said loop control system further comprises a plurality of multiplexers associated with respective storage registers and counting registers wherein each multiplexer has an output connected to an inner port of its respective counting register, said multiplexers each having as inputs said input bus, the output from said iteration means, and the output from their respective storage registers.

5. The loop control system of claim 4 wherein said control logic means includes means for causing a selected multiplexer to selectively connect one of its inputs to an input port of its respective counting register.

6. The loop control system of claim 1 wherein said iteration means comprises means for decrementing a value received from said counting means by a selected amount to produce said resultant value.

7. The loop control system of claim 1 wherein said detector means comprises means for issuing said completion signal when said new value equals zero.

8. The loop control system of claim 1 further including multiplexer means for selectively applying any of a new starting value from said digital processing system, the value currently stored in said storage means, or said resultant new value to said counting means.

* * * * *